W. J. GUEST.
AIR CUSHION TIRE.
APPLICATION FILED JULY 24, 1917.
1,260,893.
Patented Mar. 26, 1918.
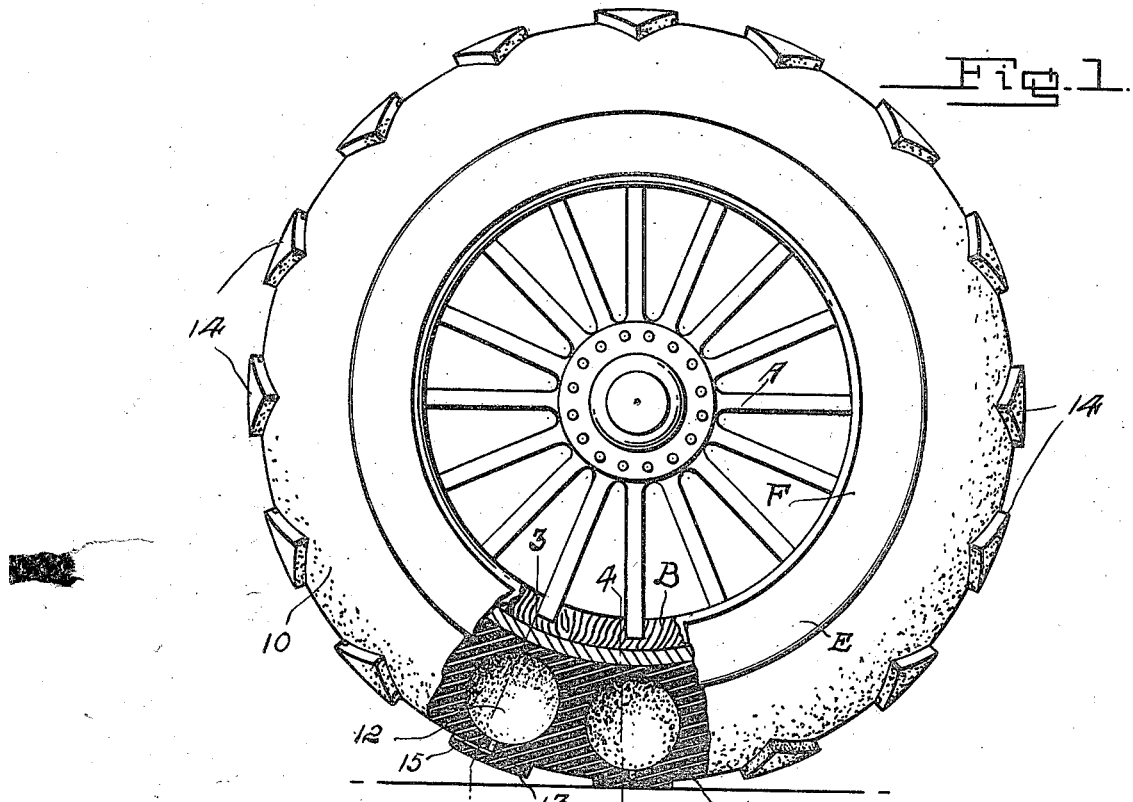
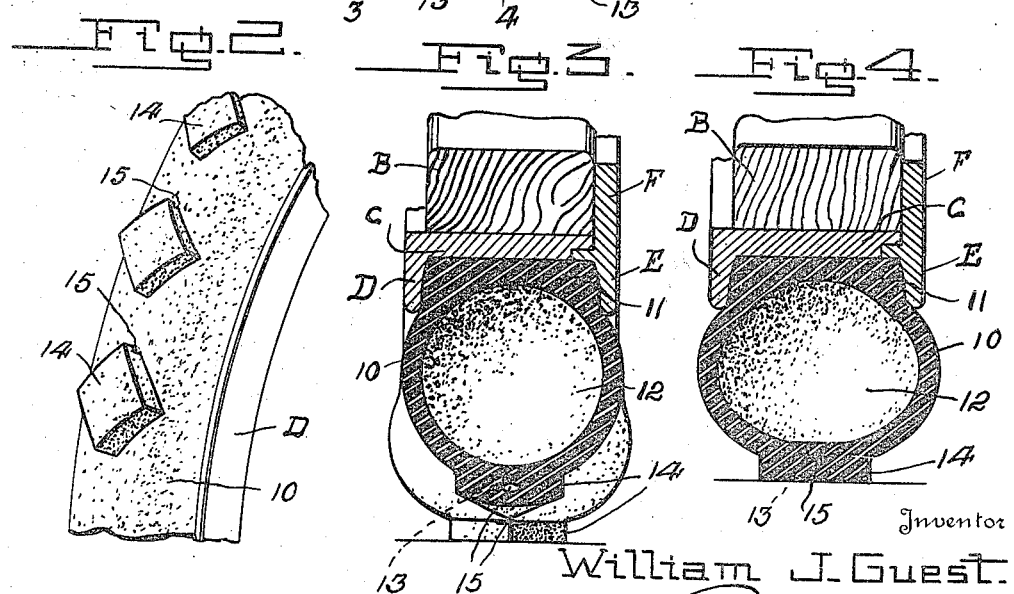
Inventor
William J. Guest.
By Lancaster & Allwine
his Attorneys

UNITED STATES PATENT OFFICE.

WILLIAM J. GUEST, OF MILFORD, CONNECTICUT.

AIR-CUSHION TIRE.

1,260,893.

Specification of Letters Patent.   Patented Mar. 26, 1918.

Application filed July 24, 1917. Serial No. 182,512.

*To all whom it may concern:*

Be it known that I, WILLIAM J. GUEST, a citizen of the United States, and a resident of Milford, in the county of New Haven and State of Connecticut, have invented a certain new and useful Improvement in Air-Cushion Tires, of which the following is a specification.

The present invention relates to cushion tires, and more particularly to a tire of the air-cushion structure.

An object of the present invention is to provide a substantially solid resilient tire with a plurality of air chambers normally open to the atmosphere; to provide the tire with a plurality of anti-skidding projections arranged at the tread portions of the tire in radial alinement with the air chambers and through which small openings are formed and adapted to be closed by the weight of the tire when engaging the roadway to seal the chamber and provide a cushion of the pneumatic type to support the tire.

The above, and various other objects and advantages of this invention will be in part described, and in part understood, from the following detailed description of the present preferred embodiment, the same being illustrated in the accompanying drawing wherein:

Figure 1 is a side elevation of a tire constructed according to the present invention as applied to a wheel, the wheel and the tire being shown partly in section.

Fig. 2 is a fragmentary perspective view of the tread portion of the tire as applied to the wheel.

Fig. 3 is a transverse section through the tire and the felly portion of the wheel, the section being taken substantially on the plane indicated by the line 3—3 in Fig. 1 and showing the exterior portion of the tire flexed and showing one of the chamber portions relaxed.

Fig. 4 is a similar view taken substantially on the line 4—4 of Fig. 1 showing the tire compressed at one of the chambered portions and with the valved opening closed.

Referring to this drawing, A designates a wheel body of any suitable construction and which is of the carrier type adapted for application to motor vehicles and the like. The wheel A is provided with a felly B having a felly band or fixed rim C applied thereto, the felly band C having at one edge an annular outturned flange D of any suitable type, and provided at its opposite edge portion with a preferably detachable annular outstanding flange E carried upon a ring or annulus F engaging against the opposite side of the felly B.

The tire of this invention comprises an annular body of resilient material, such as rubber, a composition, or the like, and which is relatively large in cross-section. The tire body, indicated at 10, is provided with an enlarged base portion 11 at the inner side of the body 10, the base portion 11 having an inner cylindrical face adapted to seat upon the felly band C with the base portion 11 engaged by the flanges D and E to retain the tire body upon the wheel. It is of course understood that the wheel and the tire-securing means carried thereby may be of any other suitable type than as shown and herein described.

The tire body 10 conforms substantially to the general contour of the ordinary pneumatic tire now in use, and is provided at suitably spaced-apart points throughout the circumferential length of the body 10 with air chambers 12, the latter being shown in the present instance as being of spherical contour, and being closely spaced apart. The tread portion of the tire body 10 is provided, in registry with each of the air chambers 12, with a relatively small air passage 13 leading radially from the chamber 12 and extending into a surface projection 14 formed upon the tread of the tire 10. The outer end of the air passage 13 communicates with a valve opening 15 which extends longitudinally and circumferentially through one end of the projection 14. This valve passage 15 is preferably of elliptical form in cross-section, as shown in Fig. 3. The resiliency of the projection 14 is adapted to hold the passage 15 open until sufficient weight is placed upon the tire and the wheel to compress the projection 14 and overcome the resiliency of the material of which the tire 10 is constructed.

A surface projection 14 is provided for each air chamber 12, and each surface projection has a valve opening 15 therein. The surface projections 14, as shown in Fig. 2, are preferably of diamond form to prevent accumulations of mud and the like adhering to the tread of the tire, and to provide anti-skidding projections of substantial size and of such form as to hold the tire from lateral and circumferential skidding.

In operation, as the tire is turned the air chambers 12 are consecutively brought to the lowermost portion of the tire and the surface projections 14 are consecutively brought into engagement with the roadway to support the tire. Normally, the valve passages 15 are opened, as shown to the left in Fig. 1, and atmospheric air is free to pass into the chambers 14 to maintain the same distended. As soon, however, as the weight of the tire is placed upon the adjacent surface projection 14, the valve opening 15 is closed, as shown at the bottom of Fig. 1, and the air within the chamber 12 is sealed therein and forms a cushion for resiliently supporting the tire and cushioning the same.

A tire of this construction eliminates the disadvantages of maintaining a constant air cushion under relatively high pressure, utilizes the resiliency of the material at the solid portions of the tire intermediate the air chambers thereof, and provides means for entrapping air under atmospheric pressure and utilizing the entrapped air for supporting and cushioning the tire.

It is of course understood that various changes and modifications may be made in the details of construction and design of the above specifically described tire without departing from the spirit of this invention, such changes and modifications being restricted only by the scope of the following claims.

I claim:—

1. In a resilient tire, the combination of a substantially solid resilient body portion having independent air chambers therein and passages leading radially from the air chambers, and surface projections carried upon the body portion of the tire and having valve openings therein communicating with the radial openings from the air chambers, said surface projections being adapted to be compressed to close said valve openings during the operation of the tire.

2. A resilient tire comprising a solid resilient body provided with independent air chambers therein and relatively small openings leading from the air chambers to the tread portion of the tire and adapted to be closed upon the compression of the tire when engaging the roadway or the like.

3. A resilient tire comprising a substantially solid resilient body portion having closely spaced-apart air chambers therein and provided with openings leading from the air chambers through the tread portion of the tire to admit atmospheric air to said chambers, said tire being provided with projections upon the tread thereof arranged over the openings and having valve openings therein communicating with the first openings, said surface projection adapted to be compressed to close the valve openings upon the flexure of the tire to entrap air in said chambers.

4. In a resilient tire, the combination of a resilient body portion provided with independent air chambers therein and openings leading radially from the air chambers through the tread portion of the tire, said tire being provided exteriorly at its tread portion with anti-skidding projections arranged opposite to the air chambers to reinforce the tire body at such points and having valve openings extending therethrough communicating with said first openings to admit atmospheric air to the chambers, said projections being adapted to be compressed to close the valve openings and seal the air in said chambers.

WILLIAM J. GUEST.